(12) United States Patent
Schwarzenthal et al.

(10) Patent No.: US 8,555,636 B2
(45) Date of Patent: Oct. 15, 2013

(54) INTERNAL COMBUSTION ENGINE WITH EXHAUST GAS TURBOCHARGER

(75) Inventors: Dietmar Schwarzenthal, Ditzingen (DE); Norbert Hemmerlein, Pforzheim (DE); Stephan Müller, Leonberg (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 874 days.

(21) Appl. No.: 12/607,184

(22) Filed: Oct. 28, 2009

(65) Prior Publication Data

US 2010/0154414 A1    Jun. 24, 2010

(30) Foreign Application Priority Data

Dec. 18, 2008    (DE) .......................... 10 2008 064 521

(51) Int. Cl.
*F02B 33/44* (2006.01)

(52) U.S. Cl.
USPC ........................................... 60/605.1; 60/614

(58) Field of Classification Search
USPC ................. 60/295, 612, 624, 605.2
See application file for complete search history.

(56) References Cited

U.S. PATENT DOCUMENTS

| | | | | |
|---|---|---|---|---|
| 4,391,098 A * | 7/1983 | Kosuge | ............................ | 60/602 |
| 4,884,407 A * | 12/1989 | Hatanaka | ........................ | 60/614 |
| 5,142,868 A * | 9/1992 | Woon et al. | ..................... | 60/624 |
| 2005/0126169 A1 * | 6/2005 | Ruess | .............................. | 60/612 |
| 2006/0162335 A1 * | 7/2006 | Vuk | ................................. | 60/612 |
| 2006/0207252 A1 * | 9/2006 | Isobe et al. | ...................... | 60/601 |
| 2008/0000226 A1 * | 1/2008 | Arndt et al. | ..................... | 60/599 |
| 2009/0107123 A1 * | 4/2009 | Vuk | ................................. | 60/295 |
| 2009/0173071 A1 * | 7/2009 | Kapich | ......................... | 60/605.2 |

FOREIGN PATENT DOCUMENTS

| | | | | |
|---|---|---|---|---|
| DE | 3729117 | | 11/1988 | |
| DE | 3729117 C1 * | | 11/1988 | ............. F02B 41/10 |
| DE | 3807372 | | 9/1989 | |
| JP | 57054622 | | 3/1982 | |
| JP | 63118340 | | 7/1988 | |
| JP | 63138434 | | 9/1988 | |
| JP | 10169455 | | 6/1998 | |
| JP | 10169455 A * | | 6/1998 | ............. F02B 37/00 |
| WO | WO 2008075130 | | 6/2008 | |
| WO | WO 2008075130 A1 * | | 6/2008 | |

OTHER PUBLICATIONS

Japanese Office Action dated Mar. 8, 2011, issued in related Japanese Patent Application No. 2009-287216, with English Translation.
English Translation of Chinese Office Action issued in corresponding Chinese Appl. No. 200910166703.0, dated Jun. 2011.

* cited by examiner

*Primary Examiner* — Kenneth Bomberg
*Assistant Examiner* — Paolo Isada
(74) *Attorney, Agent, or Firm* — RatnerPrestia

(57) ABSTRACT

An internal combustion engine with an exhaust gas manifold, an exhaust gas line, an exhaust gas turbocharger, by which the compressor provided to charge combustion air for the internal combustion engine is driven, and a bypass line, which branches from the exhaust gas line and in which a power turbine is arranged, wherein a short-circuit line branches from the bypass line and leads to a section of the exhaust gas line located downstream of the exhaust gas turbocharger. In addition, a first valve is positioned in the section of the exhaust gas line located downstream of the exhaust gas turbocharger in such a way that exhaust gas leaving the exhaust gas turbocharger is diverted into the short-circuit line and then to the power turbine.

7 Claims, 2 Drawing Sheets

INTERNAL COMBUSTION ENGINE WITH EXHAUST GAS TURBOCHARGER

CROSS REFERENCE TO RELATED APPLICATIONS

This U.S. patent application claims priority to German Application DE 10 2008 064 521.4, filed Dec. 18, 2008, which is incorporated by reference herein in its entirety.

FIELD OF THE INVENTION

The invention pertains to an internal combustion engine with an exhaust gas turbocharger.

BACKGROUND OF THE INVENTION

In modern internal combustion engines with outside ignition, engine downsizing is achieved especially with the help of turbocharging. As a result, fuel consumption can be reduced, especially during the part-load driving cycles. The disadvantage of such a concept is the delayed response of the turbocharger, the so-called "turbo lag", which means that it takes a certain amount of time for the torque to build when a load requirement is imposed. In the publication DE 37 29 117 C1, an internal combustion engine with an exhaust gas turbocharger and a power turbine is described, in which the power turbine is positioned in a bypass line. Between the bypass line and a section of the exhaust gas line downstream from the exhaust gas turbocharger, a short-circuit line is positioned, in which a throttle is provided. An internal combustion engine is also known from the publication WO 2008/075130 A1, in which two exhaust gas turbochargers are provided in the exhaust gas line. The first exhaust gas turbocharger operates a compressor, wherein the second exhaust gas turbocharger drives an electric machine. Depending on the operating point of the internal combustion engine, the electric machine is operated as a motor. In the publication DE 38 07 372 A1, furthermore, an internal combustion engine with a two-stage exhaust gas turbocharger is described, wherein a power turbine is provided in a branch of the exhaust gas line. A generator is connected to the power turbine. In the case of a full-load operating point, the entire exhaust gas stream is conducted through the first exhaust gas turbocharger, then through the power turbine, and finally the through the second exhaust gas turbocharger.

SUMMARY OF THE INVENTION

The invention is therefore related to the goal of designing an internal combustion engine of the type indicated above in a way which improves the utilization of the energy of the exhaust gas. This is achieved according to aspects of the invention by an internal combustion engine.

The inventive internal combustion engine is characterized in that a first valve is positioned in the section of the exhaust gas line located downstream of the exhaust gas turbocharger in such a way that some or all of the exhaust gas leaving the exhaust gas turbocharger is diverted into the short-circuit line and then to the power turbine. The first valve is preferably a controllable shut-off valve, such as a flap valve or a three-way valve. The valve is preferably positioned at the end of the short-circuit line in such a way that all of the exhaust gas can be diverted into the short-circuit line. The power turbine is preferably connected to an electric machine, wherein the electric machine, depending on the operating point of the internal combustion engine or depending on the exhaust gas flow rate, can be operated either as a generator or as a motor.

The inventive circuit makes it possible to divert all of the exhaust gas stream leaving the exhaust gas turbocharger into the short-circuit line and then to the power turbine. At this type of operating point, the power turbine is driven by the electric machine in order to generate a negative pressure in the section of the exhaust gas line located downstream of the exhaust gas turbocharger. This has the effect of preventing the formation of a "turbo lag". The response behavior of the exhaust gas turbocharger is therefore significantly improved even at low rpm's.

According to another embodiment of the invention, at least one second valve is positioned in the exhaust gas line and/or in the bypass line; by means of this second valve, the amount of exhaust gas diverted through the bypass line can be adjusted. The second valve is preferably designed as a controllable valve such as a flap valve or a three-way valve. As a result of the installation of the second valve, it is possible, for example, for a portion of the exhaust gas to be diverted to the power turbine at full load. Thus the electric machine is driven by the power turbine and generates electricity. The current thus obtained can be stored in a battery and/or used to supply secondary electrical units.

According to another embodiment of the invention, a connection between the exhaust gas line and the bypass line is closed by the second valve when the exhaust gas leaving the exhaust gas turbocharger is being diverted into the short-circuit line. According to aspects of the invention, all of the exhaust gas leaving the exhaust gas turbocharger is diverted into the short-circuit line at low and intermediate rpm's. The electric machine is preferably operated in this case as an electric motor. As a result, the response behavior of the exhaust gas turbocharger is improved by the negative pressure generated in the section of the exhaust gas line located downstream of the exhaust gas turbocharger.

It is obvious that the features cited above and yet to be explained below can be used not only in each of the various combinations indicated but also in other combinations or by themselves without abandoning the scope of the present invention.

BRIEF DESCRIPTION OF THE DRAWINGS

Additional features and feature combinations can be derived from the description. Concrete exemplary embodiments of the invention are illustrated in simplified fashion and explained in greater detail in the following description of the figures.

DETAILED DESCRIPTION OF THE PREFERRED EMBODIMENTS

Figure 1:
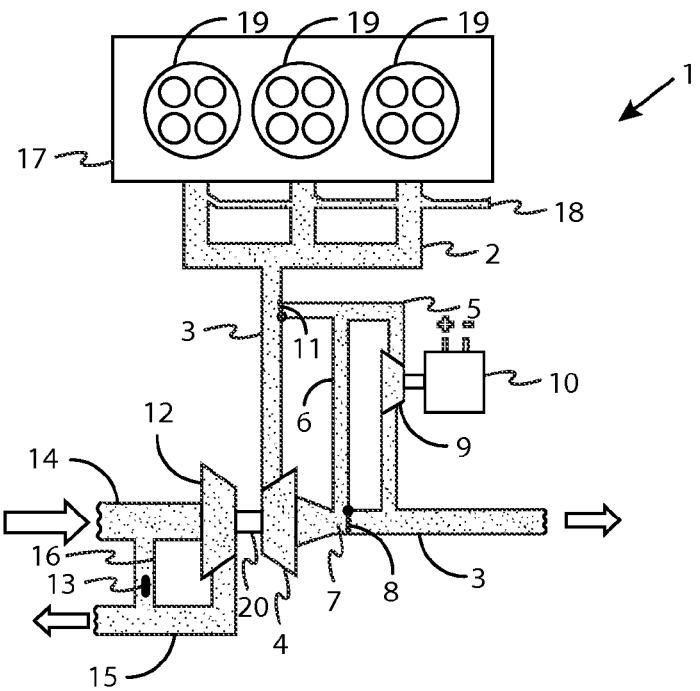
FIG. 1 shows a schematic diagram of an internal combustion engine with an exhaust gas turbocharger and a power turbine.

FIG. 1 shows a schematic diagram of an internal combustion engine 1, in which an exhaust gas manifold 2 is mounted on a cylinder head 17. In the exhaust manifold 2, the exhaust gases from the various combustion chambers 19 are collected and conducted to an exhaust gas line 3. In the exhaust gas line 3, an exhaust gas turbocharger 4 is installed, which is connected to a compressor 12 by a shaft 20. The present invention is suitable both for internal combustion engines with outside ignition and for those ignited by compression. During the operation of the internal combustion engine, the exhaust gas turbocharger 4 is subjected to a defined exhaust gas stream. As a result, the drive shaft 20 and thus also the compressor 12 are driven. By means of the compressor 12, combustion air is drawn in through the air intake line 14, compressed, and sent onward to the internal combustion engine 1 through the air charging line 15. Between the air intake line 14 and the air charging line 15, an intermediate line 16 is provided, in which a controllable shut-off means, preferably in the form of a recirculating air flap valve 13, is installed. This valve serves chiefly to throttle the charging air, especially when the internal combustion engine 1 is operating under partial load, so that, when the recirculating air flap valve 13 is in its open position, there is a bypass around the compressor 12. As a result, it is possible to conduct the mass of combustion air not needed by the internal combustion engine 1 back into the intake line 14.

According to aspects of the invention, a bypass line 5 is provided in a section of the exhaust gas line located between the exhaust gas manifold 2 and the exhaust gas turbocharger 4; through this bypass, exhaust gas can be diverted around the exhaust gas turbocharger 4. A power turbine 9, which is connected to an electric machine 10, is positioned in the bypass line 5. The electric machine 10 can be operated either as a generator or as a motor, depending on the operating point or on the demand. A short-circuit line 6, furthermore, which leads to a section 7 of the exhaust gas line located downstream of the exhaust gas turbocharger 4, branches from the bypass line 5. At the point where the short-circuit line meets the bypass line, a valve 8 is positioned, which is preferably designed as a controllable flap valve. Alternatively, the valve 8 can be formed by several switching valves, which serve to divert some or all of the exhaust gas stream leaving the exhaust gas turbocharger 4 through the short-circuit line 6, then through the bypass line 5, and finally through the power turbine 9.

Figure 2:
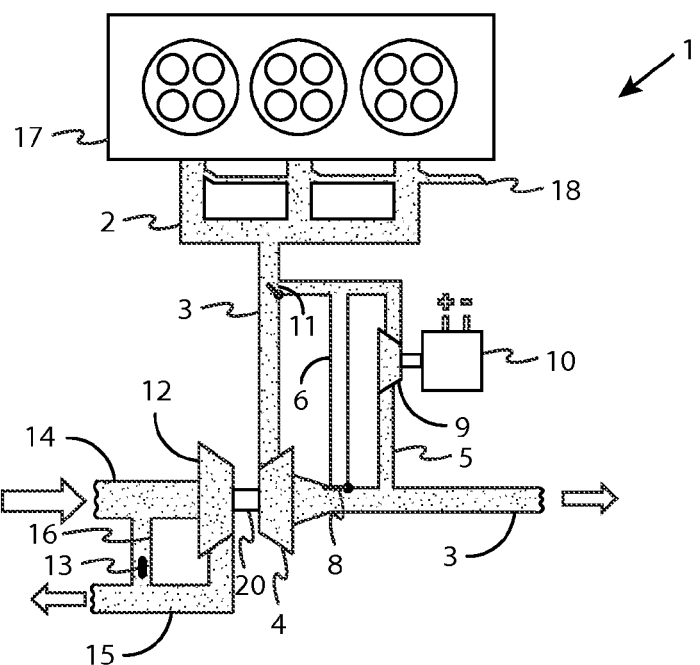
FIG. 2 shows another diagram of the internal combustion engine of FIG. 1 at full load.

Another valve 11, furthermore, is installed in a branch section between the exhaust gas line 3 and the bypass line 5; this valve is preferably designed as a controllable flap valve. By means of the valve 11, some or all of the exhaust gas stream leaving the exhaust gas manifold can be diverted into the bypass line 5. The valve 11 therefore takes over the function of a waste gate valve, which, especially in the case of high loads and high rpm's, branches some of the exhaust gas around the exhaust gas turbocharger 4 into the bypass line 5, as shown in FIG. 2. At an operating point like this, that is, at high loads and rpm's, some of the exhaust gas flows through the bypass line 5 to the power turbine 9. As shown in FIG. 2, the valve 8 closes the short-circuit line 6 in this situation. The exhaust gas energy is now converted by the power turbine 9 directly into electrical energy, which is preferably stored in a battery (not shown). Alternatively, in the cases where the internal combustion engine 1 is being used in a hybrid drive, the current recovered by means of the operation of the electric machine 10 as a generator can be used to charge the hybrid battery. The current recovered in the generator 10 could also conceivably be used to drive secondary electrical units even in the case of a hybrid drive.

In a part-load range according to FIG. 1, the valve 8 is adjusted in such a way that all of the exhaust gas leaving the exhaust gas turbocharger is diverted into the short-circuit line 6 and then to the power turbine 9. At this operating point, the bypass line 5 is closed by the valve 11, so that the all of the exhaust gas is conveyed to the exhaust gas turbocharger 4 In this position, the electric machine 10 operates as a motor. As a result, a negative pressure is produced in the section 7 of the exhaust gas line located downstream of the exhaust gas turbocharger 4. Accordingly, the response behavior of the exhaust gas turbocharger 4 is improved. Normally, the reason for the delay in the build-up of torque is the slow response of the exhaust gas turbocharger 4. To build up the torque, the rpm's of the exhaust gas turbocharger 4 must be increased, so that the compressor 12 will be able to build up the required charging pressure on the compressor side. The greater part of the energy of the exhaust gas required to accelerate the turbocharger is used to overcome the (mass) moments of inertia. Thus the energy demand for overcoming the (mass) moments of inertia is the highest as the turbocharger is being run up to speed, whereas the thermodynamic energy of the exhaust gas required to build up the charging pressure decreases once the turbocharger has run up to speed. When the electric machine 10 is being operated as a motor, a negative pressure is produced in the exhaust gas line section 7, so that the resistance of the exhaust gas turbocharger 4 attributable to the (mass) moments of inertia is reduced. To achieve a further reduction in the resistance of the turbocharger 4, the flap valve 13 is opened on the compressor side.

Figure 3:
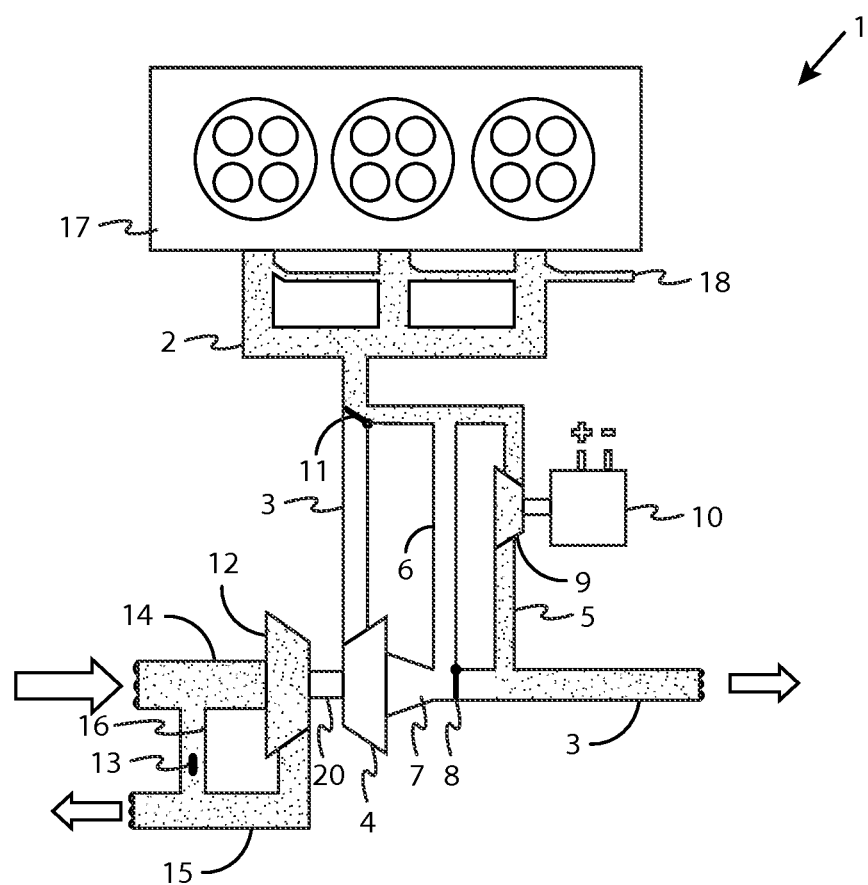
FIG. 3 shows another diagram of the internal combustion engine of FIG. 1 during a warm-up phase.

The inventive internal combustion engine 1 is also provided with a secondary air gallery 18, through which secondary air is drawn into the exhaust gas manifold 2 to heat a catalyst (not shown) during a cold-start phase of the internal combustion engine 1. According to aspects of the invention, during the cold-start phase of the internal combustion engine 1, all of the exhaust gas is conducted through the bypass line 5 and thus around the exhaust gas turbocharger 4 as shown in FIG. 3. At this operating point, the electric machine 10 is operating as an electric motor, so that negative pressure is produced in the exhaust gas manifold 2. As a result, secondary air can be drawn into the exhaust gas manifold 2 through this secondary air gallery 18 in order to bring about the desired post-reaction which heats the catalyst.

According to aspects of the invention, the positions of the various valves 8, 11, and 13 are controlled in an open-loop or closed-loop manner by a control unit (not shown), wherein the various positions assumed by the valves 8, 11, and 13 and the operation of the electric machine 10 are controlled as a function of the operating parameters of the internal combustion engine 1.

The invention claimed is:

1. An internal combustion engine comprising:
  an exhaust gas manifold;
  an exhaust gas line;
  an exhaust gas turbocharger that is configured to drive a compressor that is provided to charge combustion air for the internal combustion engine; and
  a bypass line, which branches from the exhaust gas line and in which a power turbine is arranged,
  wherein a short-circuit line branches from the bypass line and leads to a section of the exhaust gas line located downstream of the exhaust gas turbocharger,
  wherein a first valve is positioned in the section of the exhaust gas line located downstream of the exhaust gas turbocharger such that exhaust gas leaving the exhaust gas turbocharger is diverted into the short-circuit line and then to the power turbine,
  wherein the exhaust gas line extends between and connects the exhaust gas manifold and the exhaust gas turbocharger,
  wherein a second valve, which is positioned upstream of the compressor, is configured to divert the exhaust gas into the bypass line so that the exhaust gas bypasses the compressor.

2. An internal combustion engine according to claim 1, wherein the power turbine is connected to an electric machine.

3. An internal combustion engine according to claim 2, wherein, when exhaust gas leaving the exhaust gas turbocharger is diverted into the short-circuit line, the electric machine is operated as an electric motor.

4. An internal combustion engine according to claim 1, wherein the electric machine is operated either as a generator or as a motor depending on an operating point of the internal combustion engine.

5. An internal combustion engine according to claim 1, wherein said second valve is positioned in the exhaust gas line and/or in the bypass line, and said second valve being configured to adjust a quantity of exhaust gas diverted through the bypass line.

6. An internal combustion engine according to claim 1, wherein, when the exhaust gas leaving the exhaust gas turbocharger is diverted into the short-circuit line, a connection between the exhaust gas line and the bypass line is closed by the second valve.

7. An internal combustion engine according to claim 1, wherein exhaust gas leaving the exhaust gas turbocharger is diverted into the short-circuit line at low and intermediate revolutions per minute.

* * * * *